(No Model.)
L. A. & C. C. HARKER.
APPARATUS FOR MEDICATING WATER AND ADMINISTERING THE SAME.
No. 373,932. Patented Nov. 29, 1887.
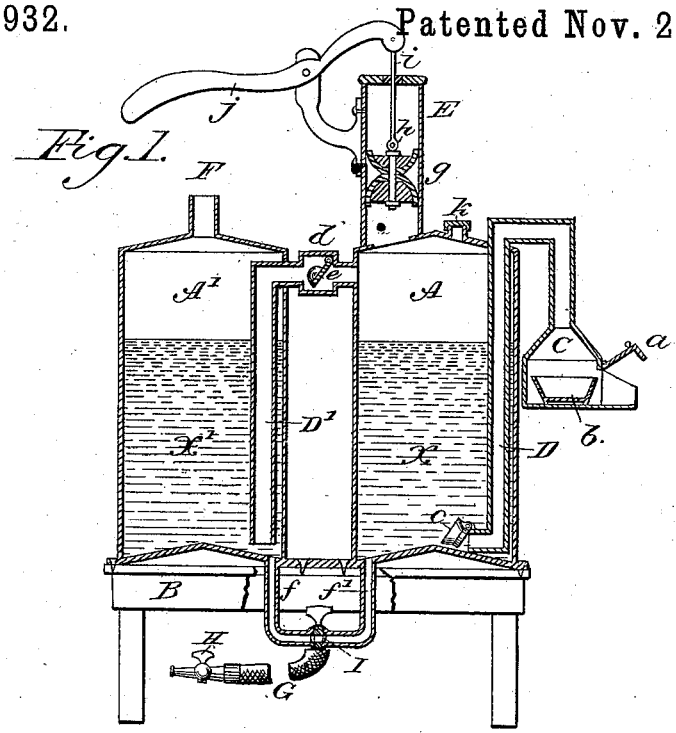
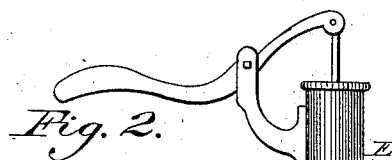
Witnesses:
Rob't Walker
H. N. Henderson
Inventor:
Lewis A. Harker
Charles C. Harker

UNITED STATES PATENT OFFICE.

LEWIS A. HARKER, OF COLUMBUS, AND CHARLES C. HARKER, OF TROY, ASSIGNORS OF ONE-THIRD TO NORRIS B. PETERS, OF MIAMI, OHIO.

APPARATUS FOR MEDICATING WATER AND ADMINISTERING THE SAME.

SPECIFICATION forming part of Letters Patent No. 373,932, dated November 29, 1887.

Application filed March 22, 1887. Serial No. 232,051. (No model.)

*To all whom it may concern:*

Be it known that we, LEWIS A. HARKER, a citizen of the United States, residing at Columbus, in the county of Franklin and State of Ohio, and CHARLES C. HARKER, a citizen of the United States, residing at Troy, in the county of Miami and State of Ohio, have invented certain useful Improvements in Apparatus for Medicating Water and the Administering of the Same by Drenching or Injection in the Treatment of Diseases in Hogs or other Animals, of which the following is a specification.

Our invention consists in the novel construction and combination of devices for administering remedies to animals, hereinafter described, and more particularly pointed out in the claim. We attain these objects by the mechanism illustrated in the accompanying drawings, in which—

Figure 1 is a vertical section of the apparatus, and Fig. 2 is a view of a side elevation.

Similar letters refer to similar parts throughout the drawings.

Referring by letter to the said drawings, A and A' indicate the tanks for holding the water to be medicated. These tanks are preferably long and narrow cylinders, so that the gas which is to be taken up by the water in its passage through it may come in contact with the largest possible amount practicable. The ends or heads of the cylinders are cone-shaped, to better withstand the pressure from the action of the pump E.

Flanges, fastened to the base of the cylinders and screwed to the bench B, serve to hold the apparatus firm and solid.

C indicates a sheet-metal furnace provided with a hinged door, $a$, in which is placed the pot or vessel $b$ to contain the substance which, when ignited, will produce gas for impregnating the water X and X' in the tanks.

D and D' are tubes for conveying the gas from the furnace to the tanks by means of the pump E. To one end of the tube D is attached the furnace, and to the other end, which is within and close to the bottom of the tank A, is attached a valve, $c$, cup-shaped, for securing greater pressure against the end of the tube D, which forms its seat, and is hereinafter referred to. The tube D' passes from the side and near the top of tank A to tank A', entering it at a corresponding location to the exit from tank A, and terminates within the tank A' near the bottom, and is constructed with an enlarged portion, $d$, said enlarged portion being formed to contain the valve $e$, hereinafter referred to.

F indicates an escape-tube, for relieving the pressure from the downward stroke of the piston of the pump on the tank A'. Said tube F is also used as a filling-orifice for the tank A'.

$f$ and $f'$ indicate tubes for drawing off the medicated water from the tanks. These tubes are connected at their base by a cock, I, which, when open, relieves both tanks simultaneously, conveying the liquid into a rubber hose and through the cock-nozzle H, as desired.

$g$ indicates the piston of the pump E, constructed of two pieces of cup-shaped packing, supported on the inner walls by wood blocks of suitable shape and on the outer walls by the cylinder of the pump, the bolt $h$ passing through all, as shown, and secured by a nut on its lower end. The head of the bolt $h$ is pivoted to the rod $i$, which in turn is pivoted to the handle $j$.

$k$ indicates a filling-tube and cap for charging the tank A with water.

The medicated water, primarily, is served to hogs or other animals as an ordinary drink; but when they have become debilitated by disease and unable or unwilling to avail themselves of it, it may be served them as a drench or as an injection—*i. e.*, a clyster—as will hereinafter be shown.

The process of medicating water with the above-described apparatus is conducted as follows: The tanks A and A' are charged, as shown by the broken lines X and X', with water—say three-fourths full. The pot or vessel $b$ is thus charged with the gas-producing substance and placed in its position in the furnace C and ignited, the combustion being regulated by the suction from the action of the pump and the amount of air admitted at the door of the furnace. As the gas is produced, it is drawn through the tube D and the water in tank A by the upward stroke of the piston $g$, impregnating the water in its passage, the valve $c$ opening to admit the gas and the valve $e$ closing to procure the suction required to produce this result. Then, with the downward stroke of the piston $g$, the valve $c$ closes and the valve $e$ opens, forcing the remaining gas in the tank A through the tube D' and into the water in tank A'. What little gas may arise above the water in tank A' and is not taken up by it in passing through escapes through the tube F.

The above-described process keeps the water violently agitated, affording excellent means for incorporating large quantities of the gas with it, and in a very short space of time.

By using the two tanks we utilize the greater part of the gas produced, and secure results from the downward stroke of the piston which with a single tank would be lost.

The pumping as performed by this apparatus is a better plan than would be an exhausting-fan, inasmuch as it affords a means of drenching and injecting the medicated water into animals directly from the apparatus, and without any change, modification, or adjustment, except, perhaps, an addition to the length of the hose.

The process of drenching or injecting the medicated water into animals directly from the apparatus is as follows: The apparatus is placed at any convenient distance from the diseased animals to be treated, with an operator to work the pump. The cock I is opened, allowing the medicated water from the tanks to commingle in its passage to the hose. The cock-nozzle is partially inserted in the animal by the person treating it, and the pressure is produced by the downward stroke of the piston of the pump by the operator, he placing the palm of his hand over the escape-tube F at the same time, and keeping it closed during the descent of the piston. The water may thus be introduced into the animal by a violent or a gradual pressure, the pressure being regulated by the nozzle-cock. It will be observed that by drawing the water simultaneously from both tanks through a single outlet any difference of strength of the medication of the water of the two tanks is perfectly harmonized.

We are aware that apparatus especially designed for medicating water for the treatment of hogs and other animals has been in use prior to our invention, and we do not therefore claim the same, broadly; but What we do claim, and desire to secure by Letters Patent, is—

A water-medicating apparatus consisting of the water-tanks A and A', having tubes D and D', furnace C, having door $a$ and pan $b$, valves $c$ and $c$, escape-tube F, draw-off pipes $f$ and $f'$, with cock I and hose attachment, and pump E, all substantially as described and shown.

LEWIS A. HARKER.
CHARLES C. HARKER.

Witnesses:
CHAS. E. BEDWELL,
H. A. KELLY.